June 17, 1930.  A. DE ANGELIS  1,765,060
LEVEL
Original Filed Sept. 25, 1926
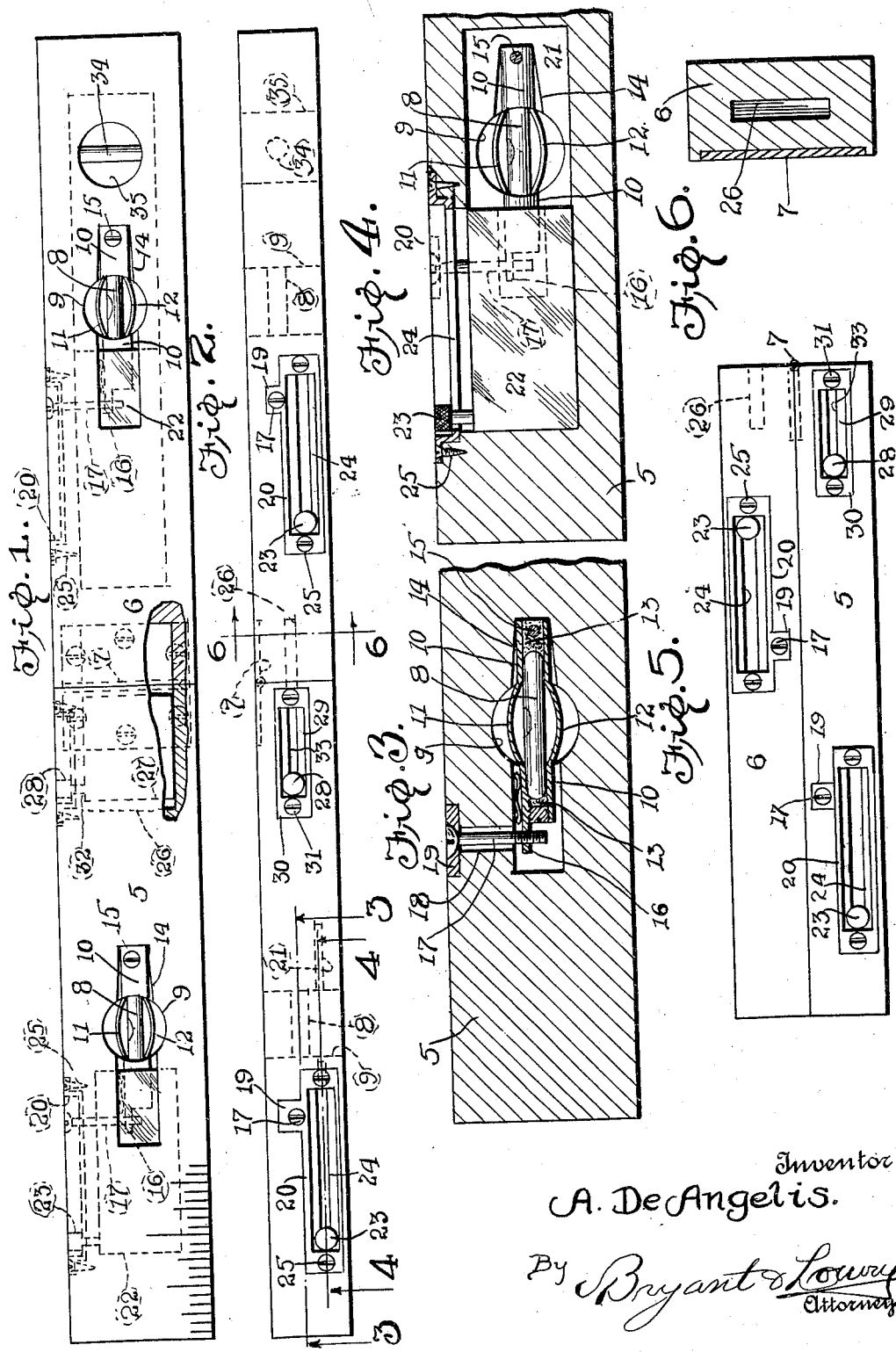
Inventor
A. De Angelis.
By Bryant & Lowry
Attorneys.

Patented June 17, 1930

1,765,060

UNITED STATES PATENT OFFICE

ANICETO DE ANGELIS, OF CLAIRTON, PENNSYLVANIA

LEVEL

Application filed September 25, 1926, Serial No. 137,652. Renewed December 20, 1929.

This invention relates to certain new and useful improvements in levels, and has more particular reference to an improved folding spirit level.

The primary object of the invention is to provide a folding spirit level which is extremely simple and durable in construction as well as efficient in use.

Another object is to provide improved means for facilitating proper mounting of the level glasses or tubes in the level bar or body so that said level glasses or tubes may be accurately set in a ready manner in proper relation to the longitudinal straight edges of the level body or bar to insure the production of an accurate instrument of this kind.

Another object is to provide sliding cover plates which may be readily manipulated to cover the normally exposed level glasses or tubes at the sides of the latter which are exposed when the level body or bar is folded, whereby accidental breakage of such level glasses or tubes will be effectively prevented when the level is not in use.

A still further object is to provide means for manipulating the level glass cover plates so that no projections are provided at the edges of the level body or bar for interfering with the proper use of the instrument.

A further object is to provide simple and improved means for retaining the sections of the level bar or body in extended or unfolded condition, which means is also of such a nature as to present no projecting members upon the faces or edges of the level bar for interfering with the proper use of the instrument.

Other objects will become apparent as the nature of the invention is better understood, and the same consists in the novel form, combination and arrangement of parts hereinafter more fully described, shown in the accompanying drawing, and claimed.

In the drawing, wherein like reference characters indicate corresponding parts throughout the several views.

Figure 1 is a side elevational view of a level constructed in accordance with the present invention and in its unfolded or extended condition;

Figure 2 is a top plan view of the device shown in Figure 1;

Figure 3 is an enlarged fragmentary vertical longitudinal section taken upon line 3—3 of Figure 2;

Figure 4 is a similar view taken upon line 4—4 of Figure 2;

Figure 5 is a top plan view of the level in folded condition; and

Figure 6 is a transverse vertical section taken upon line 6—6 of Figure 2.

Referring more in detail to the drawing, the present level includes an elongated body or bar, preferably formed of wood, and comprising a pair of similar sections 5 and 6 hingedly connected at adjacent ends by means of a leaf hinge 7 or the like so that the sections may fold to side by side contiguous relation as illustrated in Figure 5 for being readily carried when not in use. In the construction shown a leaf hinge is employed at adjacent vertical corners of the bar sections 5 and 6 so that when the level bar is opened the adjacent ends of the level bar sections 5 and 6 will be in contiguous abutting relation as illustrated in Figures 1 and 2.

In the construction shown, each bar section 5 and 6 is equipped with a longitudinal level glass 8 exposed in a transverse opening 9 of the section so that a proper view of the bubble may be had in the usual manner. As the mounting of each level glass 8 is the same, description of one will suffice for both. As shown more clearly in Figures 3 and 4, each level glass 8 is carried in a metal holder having tubular end portions 10, connected by upwardly and downwardly bowed upper and lower strips or strip members 11 and 12 respectively, the ends of the level glass 8 being disposed in the tubular end portions 10 of the holder and the intermediate portion of the level glass being disposed between the connecting strips 11 and 12 within the opening 9. In order to properly mount the level glass 8 in the tubular portions 10, a suitable packing is provided at 13.

Each holder is disposed with its tubular end portions 10 loosely arranged within grooves or recesses 14 provided in the associated bar section 5 or 6 at opposite sides of the adjacent opening 9, the recesses 14 being provided in the faces of the bar sections 5 and 6 which are outermost when the level is folded. One end of each level glass holder is pivoted in the adjacent recess 14 by means of a transverse pivot pin 15 or the like so that the level glass and holder are capable of vertical swinging movement to a limited degree as allowed by the larger size of the recesses 14 as compared to the tubular end portions 10 of the level glass holder. The free end of the level glass holder is formed with an extended lug or ear 16 whose aperture is threaded to engage the threaded stem of an adjusting screw 17 which passes freely through an adjacent vertical opening 18 of the level bar section and has its head rotatably counter-sunk in an ear 19 of the counter-sunk wear plate 20 provided in the upper edge of the level bar section. With this construction, it is apparent that the level glasses may be placed in the holders and the latter mounted in place within the openings 9 and recesses 14, whereupon the screws 17 may be engaged with the ears 16 and turned until the level glasses have been properly adjusted parallel with the longitudinal edges of the level bar, for accurate setting of the level glasses in an expeditious manner. It is particularly noted that this accurate setting of the level glasses may be accomplished without requiring a great amount of care or skill.

Each level bar section is further provided with a vertical longitudinal recess 21 which intersects the opening 9 and recesses 14 of the associated level glass and holder at the side of the latter which is outermost when the level is folded, and slidably disposed in this recess 21 is a cover or shield plate 22 of lesser length than the recess 21 so that said plate 22 may be retracted to the position shown in the several views for uncovering the opening 9 and exposing the level glass when the level is in use, or slid to the opposite end of said recess 21 for covering the level glass and opening 9 at one side of said level glass whereby breakage of the latter will be prevented when the level is folded by reason of the fact that the plate 22 will prevent articles or the like from entering the exposed side of the opening 9 and striking against the level glass. As shown clearly in Figures 2 and 4, each shield or cover plate 22 is equipped with a rigid knob 23 movable in a longitudinal depressed portion of the wear plate 20 and having a stem slidable in an elongated longitudinal slot 24 provided in the bottom of said depressed portion of wear plate 20. The wear plate 20 is counter-sunk into the upper edge of the associated bar section 5 or 6 and fastened by screws 25 or the like so that the wear plate 20 and the knob 23 are flush with the upper edge of the level bar for presenting no projections to interfere with the use of the level.

The level bar sections 5 and 6 are provided in their adjacent ends with central longitudinal sockets or recesses 26, and slidably fitted in the recess of one bar section, such as the bar section 5 is a latch bolt 27 of plate-like form adapted to be projected to slide into or enter the recess 26 of the bar section 6 for maintaining the level bar sections in extended or unfolded condition. Obviously, by retracting the latch bolt 27 into the recess 26 of bar section 5, the level may be readily folded, and when the level bar is extended or unfolded, the bolt 27 may be projected so as to enter the recess 26 of bar section 6 to thereby retain the bar sections against accidental folding, and with the adjacent ends of the bar sections in contiguous or abutting relation. The latch bolt 27 is provided near its inner end with a rigid knob 28 which is movable in a longitudinal depressed portion 29 of a wear plate 30 counter-sunk in the upper edge of the bar section 5 and secured in place by screws 31, and the knob 28 is carried upon the upper end of the vertical stem 32 rigid with the upper edge of the bolt 27 and movable in a longitudinal slot of the bar section 5 communicating with the recess 21 as well as in a longitudinal slot 33 in the bottom of the depressed portion 29 of the wear plate 30. Obviously the knob 28 may be actuated for sliding the bolt 27 to projected or retracted position, such bolt being shown retracted in the several views.

If desired, a transverse level glass 34 may be provided and exposed within a transverse opening 35 of the level bar. As shown this transverse level glass is provided in the free end portion of the lever bar section 6.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

In a level of the character described, a bar having a transverse side opening and communicating longitudinal recesses, a level glass holder having sockets in said recesses and pivoted at one end within one of said recesses, a level vial in said holder, means for adjusting said holder including an adjusting screw, an arm with which said screw engages and bows intermediate said sockets adapted to expose to view the midportion of the level vial, said sockets, bows and arm forming an integral structure.

In testimony whereof I affix my signature.

ANICETO DE ANGELIS.